US007836964B2

(12) United States Patent
Groonwald et al.

(10) Patent No.: US 7,836,964 B2
(45) Date of Patent: Nov. 23, 2010

(54) ALL-TERRAIN, DRIVE-BY-WIRE, HIGH-PRESSURE, FIRE FIGHTING APPARATUS

(75) Inventors: Rory L. Groonwald, Janesville, WI (US); Kristofor S. Cozart, Panama City, FL (US)

(73) Assignee: Orbital Technologies Corporation, Madison, WI (US)

( * ) Notice: Subject to any disclaimer, the term of this patent is extended or adjusted under 35 U.S.C. 154(b) by 240 days.

(21) Appl. No.: 12/191,934

(22) Filed: Aug. 14, 2008

(65) Prior Publication Data

US 2010/0038098 A1 Feb. 18, 2010

(51) Int. Cl.

| | |
|---|---|
| ***A62C 27/00*** | (2006.01) |
| ***B60K 17/34*** | (2006.01) |
| ***B60K 17/30*** | (2006.01) |
| ***B60K 25/00*** | (2006.01) |
| ***B60K 11/04*** | (2006.01) |
| ***B62D 11/04*** | (2006.01) |

(52) U.S. Cl. ............................. 169/24; 169/13; 169/14; 180/6.3; 180/6.48; 180/53.4; 180/68.4; 165/41

(58) Field of Classification Search ............. 169/13–15, 169/24, 52; 239/146, 147, 172; 180/6.26, 180/6.3, 6.48, 22, 53.4, 53.8, 68.4, 68.6, 180/333, 417, 442; 165/41, 43
See application file for complete search history.

(56) References Cited

U.S. PATENT DOCUMENTS 3,840,074 A * 10/1974 Clark .......................... 169/24
4,170,264 A 10/1979 Gibson
5,054,545 A 10/1991 Ghaemian
5,839,664 A 11/1998 Relyea
6,029,750 A 2/2000 Carrier
6,289,995 B1 9/2001 Fuller
6,655,613 B1 12/2003 Brown (Continued)

FOREIGN PATENT DOCUMENTS

JP 11-313902 A 11/1999

(Continued)

OTHER PUBLICATIONS

FOGTEC Mobile Systems, company pamphlet, 4 pp.

(Continued)

*Primary Examiner*—Darren W Gorman
(74) *Attorney, Agent, or Firm*—Stiennon & Stiennon

(57) ABSTRACT

An all-terrain fire fighting apparatus has a high power-to-weight ratio, a hydraulic skid steer drive system, a drive-by-wire control system, a proportionally joystick controlled nozzle turret, and a 1500 psi foam injecting water supply system which supplies the nozzle turret and a high-pressure hose mounted on a reel. To dissipate heat load from the fire fighting apparatus systems, the fire fighting apparatus cooling system employs a cooling shroud in the form of a box with multiple system radiators stacked on one face of the box and the remaining faces containing exhaust fans mounted to draw air out of the box and through the stacked heat exchangers. The fire fighting apparatus is capable of being operated remotely by means of onboard GPS, real-time imaging, and inputs to the joystick controller and fire fighting apparatus drive-by-wire system.

16 Claims, 3 Drawing Sheets

U.S. PATENT DOCUMENTS

| | | | | |
|---|---|---|---|---|
| 7,478,817 | B1 * | 1/2009 | Carrier | 180/6.48 |
| 2004/0003929 | A1 * | 1/2004 | Graf | 169/62 |
| 2005/0126631 | A1 * | 6/2005 | Gorman | 137/128 |
| 2006/0254291 | A1 | 11/2006 | Allen et al. | |
| 2007/0173987 | A1 | 7/2007 | Rowe et al. | |
| 2009/0008105 | A1 | 1/2009 | Price et al. | |
| 2009/0014186 | A1 * | 1/2009 | Collins | 169/24 |

FOREIGN PATENT DOCUMENTS

| | | | |
|---|---|---|---|
| JP | 2001-087408 | A | 4/2001 |
| JP | 2007-503880 | A | 3/2007 |

OTHER PUBLICATIONS

"Foam Firefighting Systems featuring CAT PUMPS", Cat Pumps company pamphlet, 2pp, downloaded Aug. 8, 2008.

"IN DOOR- AL-1613-3J Dual Axis Controller (With built-in motor drivers—Servo Amplifiers)", ORBIT company pamphlet, 4 pp.

"The History of FOGTEC Water Mist", http://www.fogtec-international.com/static/fogtec/en/water_mist/History/downloaded Jul. 15, 2008.

Elkhart Brass company pamphlet, 3 pp.

International Search Report for PCT/US2009/050932.

Written Opinion of the International Searching Authority for PCT/US2009/050932.

* cited by examiner

ALL-TERRAIN, DRIVE-BY-WIRE, HIGH-PRESSURE, FIRE FIGHTING APPARATUS

STATEMENT AS TO RIGHTS TO INVENTIONS MADE UNDER FEDERALLY SPONSORED RESEARCH AND DEVELOPMENT

The U.S. Government has a paid-up license in this invention and the right in limited circumstances to require the patent owner to license others on reasonable terms as provided for by the terms of Agreement No. FA8650-06-C-5910 awarded by AF Research Laboratory on Jul. 27, 2006.

CROSS REFERENCES TO RELATED APPLICATIONS

Not applicable.

BACKGROUND OF THE INVENTION

The present invention relates to fire fighting apparatus in general and to off-road all-terrain fire fighting apparatus in particular.

Although fires are principally a problem for urban areas, there are areas associated with transportation systems and natural resources where fires can result in substantial monetary damages or loss of life. Aircraft fires in particular can result in the loss of life and very valuable aircraft. It is also well known that aircraft are exposed to the greatest hazards while taking off and landing, and are inherently lightweight structures containing relatively large amounts of flammable liquids. While accidents involving aircraft sometimes occur on the runway or taxi strips, often enough a plane lands short of the runway, or runs off the end of the runway. In either case the planes are often beyond access by over the road vehicles. Off-road fire engines are well-known, both for fighting aircraft fires and for fighting brushfires and forest fires.

The off-road fire engine has some unique requirements and difficulties. Principal among these is the difficulty of all terrain navigation, which tends to limit the size of the vehicle and the amount of water that can be carried in the fire engine. One technology for dealing with a limited water supply is the use of a foaming agent, another approach is to use high-pressure water at the neighborhood of 1500 psi to create a water fog. Joystick controlled water nozzles are also known to provide better control over the nozzle and to facilitate remote operation of the nozzle. However, joystick controllers currently used to control high pressure water nozzles are relatively simple devices using limit switches to drive the nozzle in two directions at a constant rate and without advanced programming capabilities. Further, while water nozzles can be controlled remotely, the fire engine itself must be manually operated. What is needed is a fire fighting apparatus suitable for fighting off road fires which incorporates the latest developments in firefighting techniques with advanced control systems which allow flexibility in configuration and even remote operation.

SUMMARY OF THE INVENTION

The all-terrain fire fighting apparatus of this invention has an engine frame which has a forward end and an aft end. An operator cab is mounted to the forward end of the engine frame and a rear cab covers the vehicle engine and equipment. Each side of the engine frame mounts four all-terrain traction wheels connected to a common drivetrain driven by a hydraulic drive motor. Each drive motor is driven by a separate hydraulic drive pump. The hydraulic drive pumps are connected to a main gearbox mounted to the front of a 170-190 hp diesel turbo charged engine, The gear box is arranged to be driven by the engine crankshaft. The fire fighting apparatus is steered by differentially controlling the hydraulic motors using a so-called skid steer system. Mounted in front of the cab is a high-pressure nozzle turret, which is proportionately controlled in two axes by a joystick. The joystick provides inputs to a programmable controller which provides a proportional control and programmable functionality. Mounted under the cab is a diesel fuel tank, followed by a hydraulic fluid tank. Mounted above a central portion of the engine frame is a 300 gallon water tank which also incorporates a 36 gallon foam additive tank. The foam additive tank supplies foam additive to a low pressure positive displacement piston pump driven by an electrically controlled motor which allows foam additive to be metered to the low-pressure side of a high-pressure water pump. The high-pressure water pump has a capacity of about 60 gallons per minute at 1500 psi. The high-pressure water pump receives water from the water tank and foaming agent from the foaming agent tank and is driven by a hydraulic motor. The high-pressure pump drive motor is in turn connected to a third hydraulic pump which is mounted to the main gearbox beneath the two drive motor pumps. The high-pressure water pump supplies water to the forward mounted nozzle turret, about 60 gallons per minute, and to a hose reel mounted at the rear of the fire fighting apparatus, about 20 gallons per minute. If the hose is used at the same time as the nozzle the forward mounted nozzle turret is limited to 40 gallons per minute.

Operation of the fire fighting apparatus employs a drive-by-wire control system with a single proportional pedal control for forward movement and braking, and a steering wheel which provides a control signal to the fire fighting apparatus controller. The engine controller in turn controls the flow of hydraulic drive fluid to the traction motors to control the speed and direction of the fire fighting apparatus. The use of the computer-controlled interface between input sensors and the systems being driven allows the use of programmed functions, both in the operation of the water nozzle turret mounted to the forward bumper and in the operation of the vehicle itself.

It is a feature of the present invention to provide an all-terrain fire fighting apparatus of improved functionality.

It is another feature of the present invention is to provide an all-terrain fire fighting apparatus which can be operated remotely, or with one or two operators.

It is yet another feature of the present invention to provide an all-terrain fire fighting apparatus of small size but high fire suppression capability.

Further features and advantages of the invention will be apparent from the following detailed description when taken in conjunction with the accompanying drawings.

DESCRIPTION OF THE PREFERRED EMBODIMENTS

Figure 1:
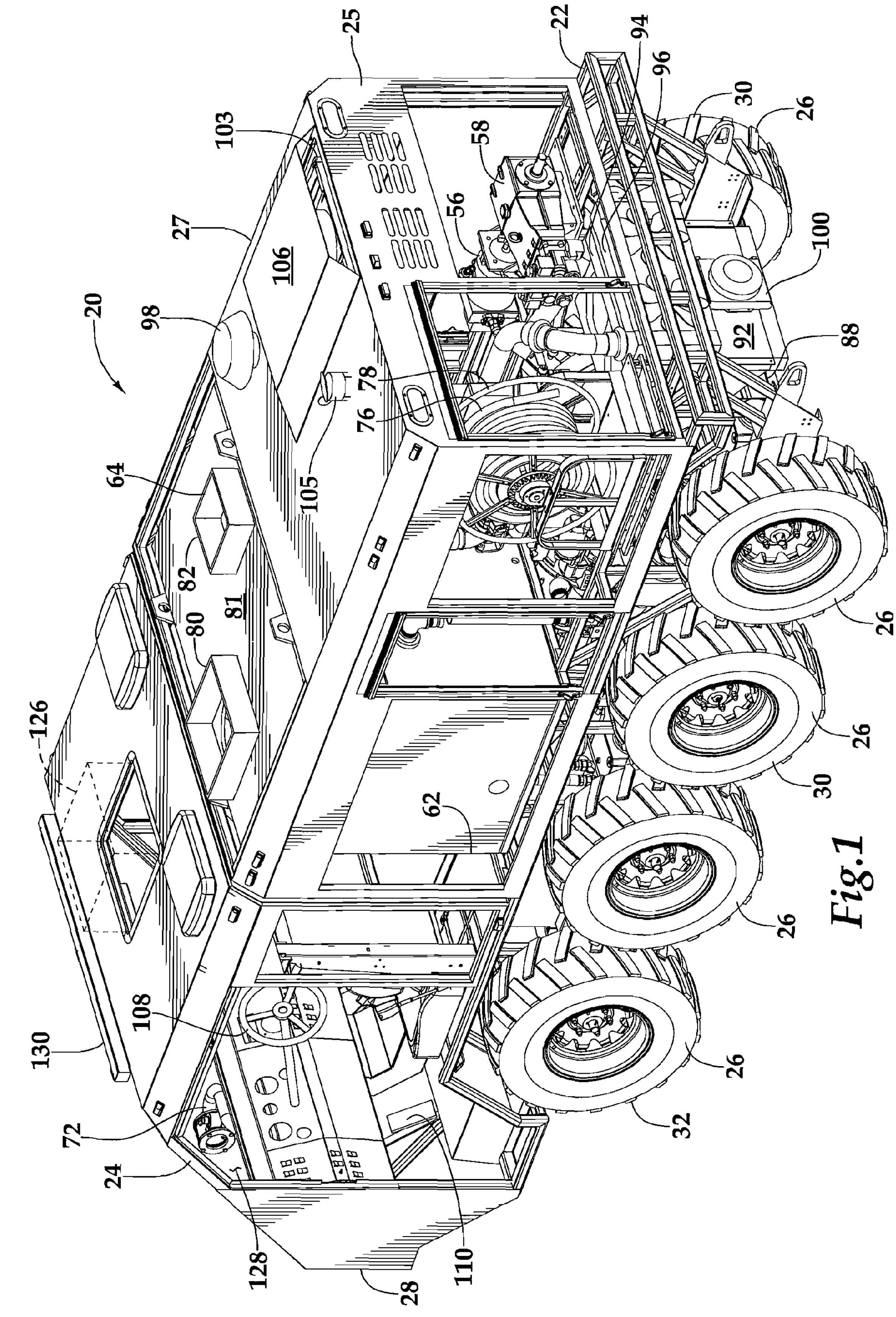
FIG. 1 is an isometric view of the all-terrain fire fighting apparatus of this invention.
Figure 2:
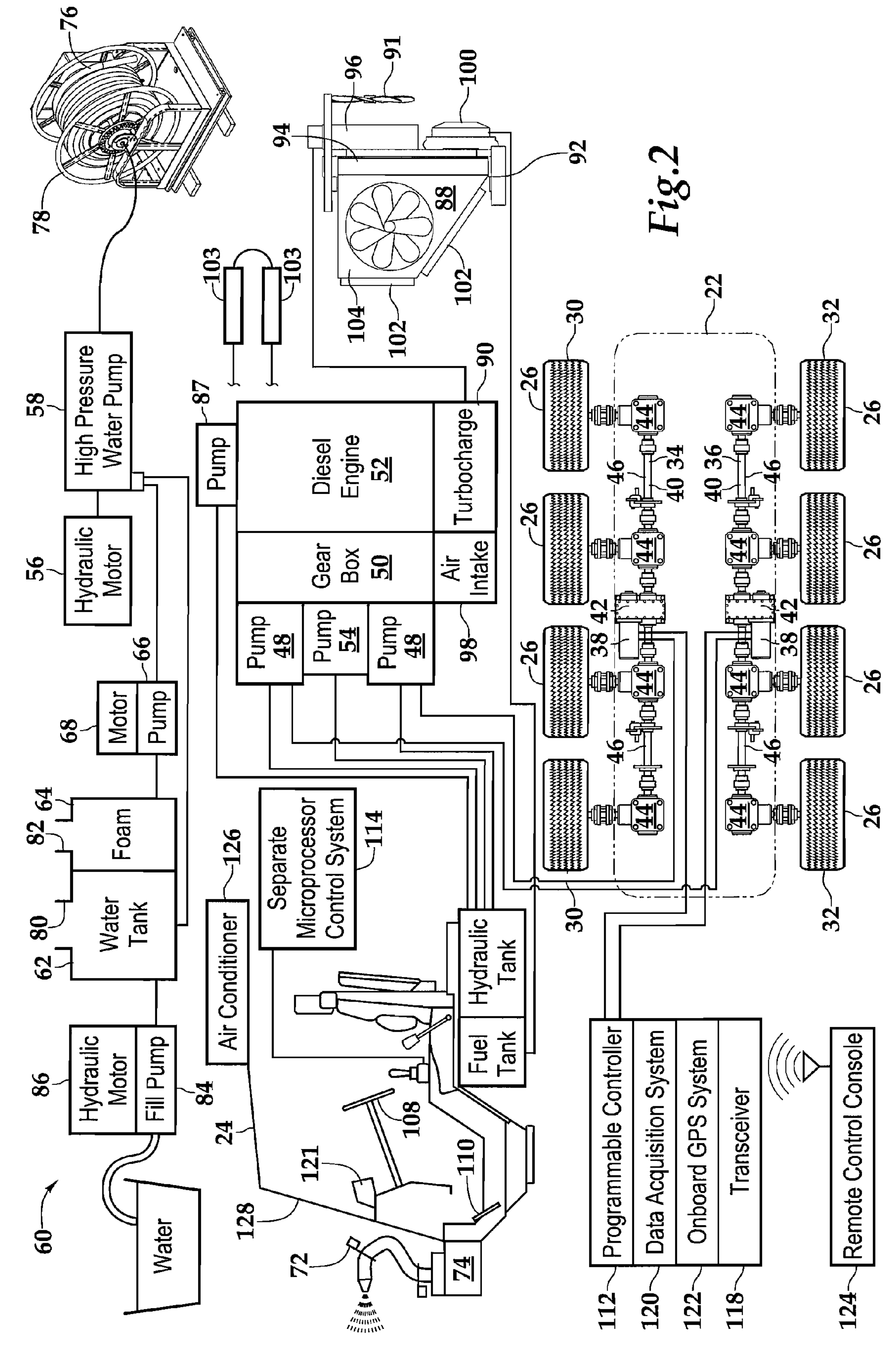
FIG. 2 is a schematic view of the systems on the all-terrain fire fighting apparatus of FIG. 1.
Figure 3:
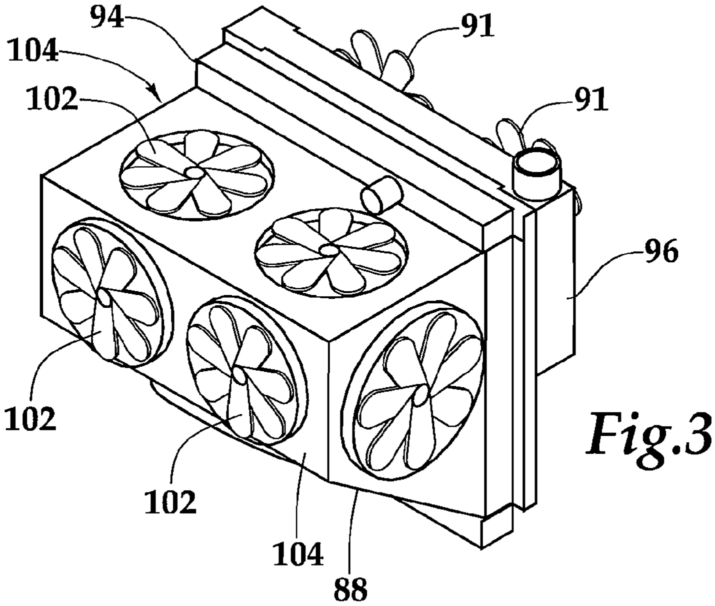
FIG. 3 is an isometric view of the cooling system shroud and the radiators mounted thereto employed by the fire fighting apparatus of FIG. 1

Referring more particularly to FIGS. 1-3, wherein like numbers refer to similar parts, an all-terrain fire fighting apparatus 20 is shown in FIG. 1. The fire fighting apparatus 20 has a frame 22 which has a forward end 28 to which a forward cab 24 is mounted, and an aft end 25 to which an aft cab 27 is mounted and arranged to cover the aft end. As shown schematically in FIG. 2, four traction wheels 26 are on each side of the frame. The traction wheels 26 are divided into two groups, a group of four starboard wheels 30 and a group of four port wheels 32. The starboard wheels 30 are driven by a starboard drivetrain 34 and the port wheels 32 are driven by a port drivetrain 36. Each drivetrain 34, 36 is comprised of a positive displacement hydraulic traction motor 38 which drives a shaft 40 through a gearbox 42. The shaft is formed by four interconnected right angled gearboxes 44 connected by linking shafts 46. Each right angled gearbox 44 drives one wheel 26. Because the port and starboard wheels are driven independently, the vehicle can be skid steered, like a battle tank, such that it can spin in place. Further, because all the wheels are driven together, all the drive power supplied by the traction motor 38 of either the port or starboard side is applied to the wheel 26 with the most traction. Braking action is provided by reducing, then completely shutting off, hydraulic flow through the traction motors 38. Without hydraulic flow to the traction motors 38 the wheels are effectively locked against rotation.

A drive engine 52 is mounted to the fire fighting apparatus Frame 22 and provides power to all the vehicle systems. Each traction motor 38 is in turn driven by hydraulic traction pump 48 mounted to a main gearbox 50 which in turn is mounted to the drive shaft of a turbo-charged 170 hp Commins® diesel engine which functions as the drive engine 52. The main gearbox 50 also provides power to a pump 54 which supplies hydraulic fluid to drive a motor 56 which is connected to a high-pressure water piston pump 58 which can supply 60 gallons per minute at a water pressure of 1500 psi. Such a high-pressure water pump is manufactured by CAT PUMPS of Minneapolis, Minn.

A fire suppression system 60 is comprised of a main water tank 62 which is mounted behind the cab 24 as shown in FIG. 1. The main water tank 62 is constructed of welded polyethylene, and incorporates anti-slosh baffles to minimize slosh moments which are created by acceleration-induced waves in the water tank. The tank 62 also incorporates a 36 gallon foaming agent tank 64 which, as shown in FIG. 2, is connected to a low-pressure metering pump 66 driven by an electric metering motor 68 which controls the addition of foaming agent to the low-pressure inlet 70 of the high-pressure pump 58. The main water tank 62 is also connected in water supplying relation to the low-pressure input 70 on the high-pressure water pump 58. The output of the high-pressure pump 58 is connected to a two axis nozzle turret 72 mounted to the forward bumper 74 of the fire fighting apparatus 20, and to a high-pressure hose 76 contained on a high-pressure hose reel 78 mounted to the aft end 25 of the fire fighting apparatus 20.

The water tank 62 has a fill/vent opening 80 which opens to the roof 81 of the fire fighting apparatus 20 as shown in FIG. 1, the water tank also has a fill/vent opening 82 which opens into the foaming agent tank 64. The fill/vent openings 80, 82 allow the water tank 62 and the foaming agent tank 64 to be rapidly filled from overhead. As shown in FIG. 2, the fire fighting apparatus 20 may also refill the water tank 62 using an onboard suction pump 84 which is driven by a fill hydraulic motor 86. The fill hydraulic motor 86 is driven by a drive motor 87 mounted to a power takeoff on the diesel engine 52. The suction pump 84 can withdraw water from a pond or stream in the field or can return to pre-positioned water tanks positioned on improved roadways which can be resupplied by conventional tankers. The suction pump 84 is sized such that a fire fighting apparatus 20 can refill its water tank in three minutes or less.

The fire fighting apparatus 20 has a gross dry weight of approximately 7,600 lbs or 10,000 lbs wet weight and thus a power-to-dry-weight ratio of over 40 hp per dry ton, which is more than twice that of typical over-the-road fire engines. The fire fighting apparatus 20 is a lightweight high-powered fire fighting apparatus which provides unique firefighting capability, however the high-powered power dissipation requires a specialized cooling system which can handle a heat load on the order of 250,000 BTUs per hour. As shown in FIGS. 2 and 3, the cooling system has a shroud 88 forming a trapezoidal prismatic six-sided solid. An engine liquid cooling system radiator 94 is mounted on the aft-most face 92 of the shroud 88. An air-to-air heat exchanger 96 is positioned aft of the engine radiator which serves to pre-cool air from the engine turbocharger 90 before it is supplied to the engine air intake 98. The shroud 88 has seven exhaust fans 102 mounted to the prismatic sides 104 of the shroud which are not covered by the heat exchangers 94, 96. The shroud fans 102 draw air through the air-to-air heat exchanger 96, the engine radiator 94, and a fuel pre-cooler 100 positioned below the air-to-air heat exchanger 96. The exhaust fans 102 dump the cooling air so it passes out below the vehicle and through the opening between the wheels 26. Cooling air can also be driven through the air-to-air heat exchanger 96 and the engine radiator 94 by two fans 91 supplying 3,500 $ft.^3$ per minute of cooling air. As shown in FIG. 1, a double pass hydraulic radiator 103 is mounted to the top of the aft cab 25 beneath an aft shroud 106 and is open to the aft of the fire fighting apparatus 20. The majority of the waste heat produced by the engine is removed with the engine exhaust through an exhaust pipe 105 extending upwardly from the engine.

The control system employs a programmable controller 112 which receives sensor inputs from a steering wheel 108, and a foot-operated acceleration/brake pedal 110 in the forward cab 24 driver compartment. The control system utilizes an IQAN-MD3 master module and software from Parker Hannifin Corporation which is a controller and software package designed for the control of hydraulic equipment. The vehicle is driven with the simple inputs from the steering wheel 108, the acceleration/brake pedal 110, and a reversing switch which puts the fire fighting apparatus in a reverse mode for backing up. The fire fighting apparatus 20 has a maximum speed of about 20 miles an hour and the inputs from the steering wheel 108 and pedal 110 are used to control the hydraulic pressures supplied to the drive motors 38. A sufficiently large turning motion will result in the reversal of one of the drivetrains 34, 36 so that the vehicle will spin to the right or left in place. The all hydraulic drive-by-wire control system is flexible and it can be programmed to change the way the vehicle responds to control inputs. The vehicle has an onboard GPS system 122 which provides GPS coordinates and map overlays allowing the vehicle to be operated in low visibility such as caused by smoke. The vehicle has a data acquisition system 120 which includes realtime imaging equipment for documentation or remote operation of the fire fighting apparatus 20. Because the fire fighting apparatus 20 employs a drive-by-wire control system, i.e., there is no mechanical connection between the controls in the vehicle systems, a transceiver 118 which sends real-time imaging, position data, and situation awareness data, and receives control inputs from a remote control console 124 can be used. In other words the fire fighting apparatus design lends itself to remote operation because it uses a drive-by-wire control scheme.

Figure 4:
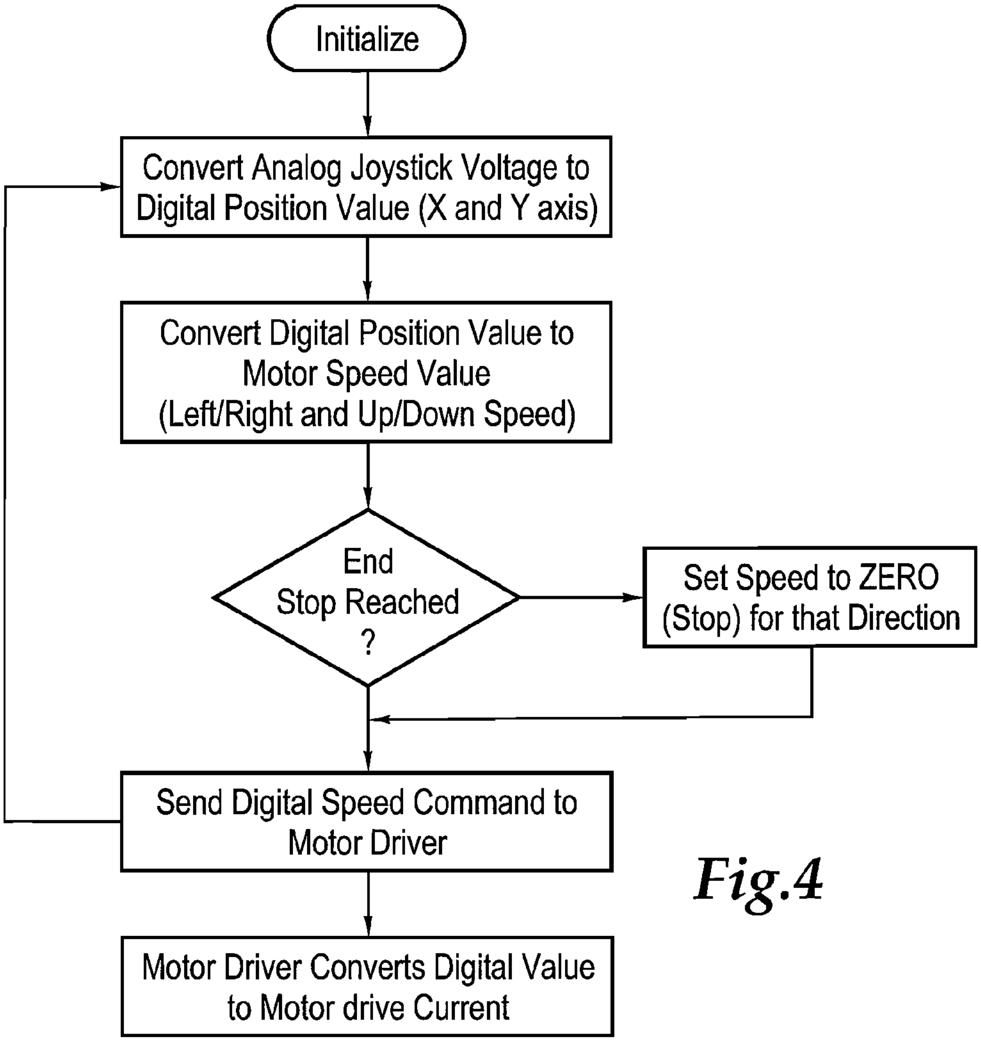
FIG. 4 is a flow diagram of the proportional joystick controller used to control a forward nozzle turret of the all-terrain fire fighting apparatus of FIG. 1.

A separate microprocessor control system 114 based on an Atmel AT89C51CC01 is utilized to provide programmable functionality to the nozzle turret 72 based on joystick 116 inputs as shown in FIG. 4. The joystick 116 provides analog inputs which are converted to digital position values which are then set to drive the X and Y control axes of the nozzle turret proportionately so that larger control inputs to the joystick result in faster control motions in the X and Y axes. The programmable controller can also provide additional functions such as automatic pre-programmed spray patterns as well as remembering and repeating the last control movements entered by the operator. The joystick may incorporate a third axis of freedom such as rotation of the joystick to control the amount of foam additive which is supplied to the high-pressure water pump inlet 70. A suitable arrangement for the water turret 72 is shown in U.S. Pat. No. 6,655,613 which is incorporated herein by reference.

The forward cab 24 is normally sealed by doors (not shown) and the interior of the cabin supplied by an air conditioner 126 shown in phantom in FIG. 1. The air-conditioning unit provides cooling and removal of dust, smoke and other contaminants. The forward windshield 128 is cooled by misting bar 130 which is supplied by a small electric motor (not shown) which draws water from the main water tank 62.

The fire fighting apparatus 20 is operated as a rapid first response vehicle, which can be operated by a driver with or without a second operator. The all hydraulic drive-by-wire operating system provides a highly maneuverable transmission free vehicle with an overland speed of approximately 20 miles an hour. The firefighting capabilities of the vehicle are greatly increased by the use of a high-pressure water system which produces a fine mist or fog of water droplets in the range of about 90% between 10 μm and 50 μm. Mist water systems provide fast removal of heat through rapid evaporation and a smothering effect by displacing oxygen with water vapor. The high surface area of the water droplets extracts heat rapidly from the fire producing a strong cooling effect. This also serves a protective function protecting people and property against the effects of radiant heat, for example isolating a portion of an aircraft which is burning from the crew cabin while personnel are being extracted. The rapid evaporation of the extremely small water droplets generates water vapor, increasing the water volume by 1,640 times and producing a localized inerting effect by depleting oxygen locally. The water mist is also effectively insulating, allowing water mist to be used directly on electrical fires. The water mist is lightweight and floats over the surface of burning hydrocarbons making water mist and an effective fire fighting agent for burning fuels. The cumulative result is that the 300 gallon water supply becomes as effective as a much larger quantity of water, and is effective for fighting a broad range of fires. High-pressure water can also be used to generate foam without the added weight and complexity of compressed air equipment. The metered addition of a foaming agent from the foam tank 64 with the metering motor 68 can be used to produce any type of foam desired. Aqueous film-forming foam (AFFF) developed by the Navy in the mid-60s is an example of a synthetic foam which has a low viscosity and spreads rapidly across the surface of most hydrocarbon fuels. The foam forms a water layer over the liquid fuel and stops the formation of flammable vapors, which is critical in providing a rapid suppression of a fire in a crash and rescue situation.

The all-terrain fire fighting apparatus 20 provides the capability of fighting fires with limited manpower, as a single operator can maneuver the engine while fighting the fire by means of the bumper mounted nozzle turret 72 and the joystick 116. The engine's rapid self-filling and high maneuverability allows even a few units, each with a single operator, to maintain continuous fire suppression operations at a considerable distance from the ends of a runway. The enclosed and air-conditioned crew cab 24 and the high maneuverability can greatly improve operator safety when operating against brush-fires which can rapidly change direction. The drive-by-wire system even allows the remote operation of the firefighting equipment. This can substantially reduce costs as standby personnel anywhere in the world can be used to augment locally available forces to respond to a fire. Remote operation also allows operation under enemy fire or in the presence of munitions.

It should be understood that the fire fighting apparatus 20 incorporates numerous conventional parts associated with the systems described, for example hydraulic filters, accumulators and arrangements for recirculation of hydraulic fluids, and alternators, batteries, power supplies and starting motors.

It should be understood that high-pressure water means water with a pressure of over 1000 psi to as much as 1700 psi, and a high pressure pump is a pump of the type which produces such high-pressure water.

It is understood that the invention is not limited to the particular construction and arrangement of parts herein illustrated and described, but embraces all such modified forms thereof as come within the scope of the following claims.

We claim:

1. An all-terrain fire fighting apparatus comprising:

an engine frame having a forward end, an aft end, a starboard side and a port side;

a drive engine mounted to the engine frame between the forward end and the aft end of the engine frame;

a plurality of starboard traction wheels mounted to the starboard side of the engine frame, so as to support the starboard side of the engine frame over the ground;

a starboard drivetrain connected to drive all the starboard traction wheels in tandem;

a starboard hydraulic drive motor connected in driving relation to the starboard drivetrain;

a plurality of port traction wheels mounted to the port side of the engine frame, so as to support the port side of the engine frame over the ground;

a port drivetrain connected to drive all the port traction wheels in tandem;

a port hydraulic drive motor connected in driving relation to the port drivetrain;

an occupant cab, with accommodations for at least one operator;

a water tank mounted to the frame between the occupant cab and the engine;

a high pressure water pump connected in water receiving relation to the water tank;

a water pump hydraulic drive motor connected in driving relation to the high pressure water pump;

a starboard drive hydraulic pump connected to the drive engine to be driven, and connected to supply hydraulic fluid to drive the starboard hydraulic drive motor;

a port drive hydraulic pump connected to the drive engine to be driven, and connected to supply hydraulic fluid to drive the port hydraulic drive motor;

a water pump drive hydraulic pump connected to the drive engine to be driven, and connected to supply hydraulic fluid to drive the water pump hydraulic drive motor;

a water nozzle connected to an output of the high pressure water pump in water receiving relation, the water nozzle mounted to the forward end of the engine frame in front of the cab, the nozzle mounted with two degrees of freedom;

a drive-by-wire control system including a steering wheel, and a pedal, the drive-by-wire system connected to the port hydraulic drive motor and the starboard drive motor to provide acceleration and braking, in response to motion of the pedal, and steering in response to rotation of the steering wheel;

a proportional joystick mounted in the occupant cab and having at least two control movements; and a joystick control system connected between the water nozzle and the joystick to drive the nozzle in the two degrees of freedom in proportion to control moments input in to the joystick;

a fire fighting apparatus cooling system mounted to the engine frame having a cooling shroud in the form of a box with a multiplicity of sides, and multiple system radiators stacked on one side of said multiplicity of sides of the box, and a plurality of exhaust fans mounted to said multiplicity of sides which draw air out of the box and through said multiple system radiators.

2. The fire fighting apparatus of claim 1 further comprising a high-pressure hose connected to the output of the high pressure water pump in water receiving relation, and wound on a reel mounted to the aft end of the engine frame.

3. The fire fighting apparatus of claim 1 further comprising a foam agent tank mounted to the engine frame, and in foam agent supplying relation to the nozzle, and wherein the joystick has a third control movement, and the joystick control system is arranged to control the supply of foam agent to the nozzle.

4. The fire fighting apparatus of claim 1 wherein the starboard drivetrain further comprises a plurality of gear boxes, such that each traction wheel has a gear box in driving relation thereto, and a drive shaft connects said gear boxes through a further gear box to the starboard hydraulic drive motor; and wherein the port drivetrain further comprises a plurality of gear boxes, such that each traction wheel has a gear box in driving relation thereto, and a drive shaft connects said gear boxes through a further gear box to the port hydraulic drive motor.

5. The fire fighting apparatus of claim 1 wherein the drive engine is a water cooled diesel engine with a radiator which faces the aft end of the engine frame and is cooled by fans.

6. The fire fighting apparatus of claim 1 wherein there are four traction wheels mounted to the starboard side of the engine frame and four traction wheels mounted to the port side of the engine frame.

7. The fire fighting apparatus of claim 1 further comprising a transceiver mounted to the engine frame and connected to the drive-by-wire control system to provide control inputs to drive the fire fighting apparatus remotely.

8. An all-terrain fire fighting apparatus comprising:

an engine frame;

a drive engine mounted to the engine frame, driving a plurality of hydraulic pumps;

a plurality of port side traction wheels connected to a drivetrain driven by a hydraulic motor driven by one of said plurality of hydraulic pumps;

a plurality of starboard traction wheels connected to a drivetrain driven by a hydraulic motor driven by one of said plurality of hydraulic pumps wherein the all-terrain fire fighting apparatus can be skid steered;

a water tank mounted to the engine frame;

a high-pressure water pump connected in water receiving relation to the water tank and mounted to the engine frame and driven by one of said plurality of hydraulic pumps; and a nozzle turret driven in two degrees of freedom by a proportional joystick mounted to the engine frame, the nozzle turret connected in water receiving relation to the high pressure water pump;

a drive-by-wire control system having electronic control inputs and arranged to provide control out puts to drive the all-terrain fire fighting apparatus;

a fire fighting apparatus cooling system mounted to the engine frame having a cooling shroud in the form of a box with a multiplicity of sides, and multiple system radiators stacked on one side of said multiplicity of sides and a plurality of exhaust fans mounted to said multiplicity of sides which draw air out of the box and through said multiple system radiators.

9. The all-terrain fire fighting apparatus of claim 8 wherein the water tank has an upwardly opening fill and vent port mounted uppermost to the water tank and extending above surrounding fire fighting apparatus structure.

10. The all-terrain fire fighting apparatus of claim 9 wherein the water tank has portions defining a foaming agent tank which also has an upwardly opening fill and vent port mounted uppermost to the water tank and extending above surrounding fire fighting apparatus structure.

11. The all-terrain fire fighting apparatus of claim 9 further comprising a forward cab mounted to the engine frame and enclosing an operator station, the forward cab having a forward facing windshield, and a misting bar mounted above the windshield and connected to the water tank to supply a cooling water mist to an exterior of the windshield.

12. The all-terrain fire fighting apparatus of claim 8 further comprising a high-pressure hose connected in water receiving relation to the high pressure water pump, and wound on a reel mounted to the engine frame.

13. The all-terrain fire fighting apparatus of claim 8 wherein the starboard drivetrain comprises a gear box in driving relation to each traction wheel and a drive shaft connecting said gear boxes through a further gear box to the starboard hydraulic drive motor; and wherein the port drivetrain comprises a gear box in driving relation to each traction wheel and a drive shaft connecting said gear boxes through a further gear box to the port hydraulic drive motor.

14. The all-terrain fire fighting apparatus of claim 8 wherein the drive engine is a water cooled diesel engine with an engine radiator, an air-to-air heat exchanger supplying combustion air to said diesel engine, and a fuel cooling radiator which form said multiple system radiators.

15. The all-terrain fire fighting apparatus of claim 8 further comprising a transceiver mounted to the engine frame and connected to the drive-by-wire control system to provide control inputs to drive the all-terrain fire fighting apparatus remotely.

16. The all-terrain fire fighting apparatus of claim 8 wherein the drive engine has at least 40 hp for every ton of vehicle dry weight.

* * * * *